March 2, 1965 J. P. McGUIRE 3,172,044

AUTOMATIC DELAY LINE CONTROL UTILIZING MAGNETOSTRICTIVE DELAY LINE

Filed Oct. 8, 1962 4 Sheets-Sheet 1

INVENTOR.
JOHN P. McGUIRE

BY H. S. Mackey

ATTORNEY.

INVENTOR.
JOHN P. McGUIRE
BY H. S. Mackey
ATTORNEY.

INVENTOR.
JOHN P. McGUIRE
BY H. I. Mackey
ATTORNEY.

March 2, 1965 J. P. McGUIRE 3,172,044

AUTOMATIC DELAY LINE CONTROL UTILIZING MAGNETOSTRICTIVE DELAY LINE

Filed Oct. 8, 1962 4 Sheets-Sheet 4

INVENTOR.
JOHN P. McGUIRE

BY H. A. Mackey

ATTORNEY.

United States Patent Office 3,172,044
Patented Mar. 2, 1965

3,172,044
AUTOMATIC DELAY LINE CONTROL UTILIZING MAGNETOSTRICTIVE DELAY LINE

John P. McGuire, Briarcliff Manor, N.Y., assignor to General Precision, Inc., a corporation of Delaware Filed Oct. 8, 1962, Ser. No. 228,931
4 Claims. (Cl. 328—55)

This invention relates to delay lines for use in computing circuits.

Delay lines are generally temperature sensitive and for this and other reasons their time delay should be supervised and controlled. A magnetostrictive delay line, for example, is conventionally controlled by enclosing it in a thermostatically-controlled box so as to keep its temperature constant. Thus the principal source of delay error is eliminated.

The present invention keeps the delay of a delay line constant by monitoring its delay time instead of monitoring its temperature variations. In cases where the time delay may vary but the relation between delay time and computer clock time must be held constant, the output of the apparatus of this invention may be employed to adjust the clock frequency instead of the delay time period.

In one embodiment of the invention both data and testing pulses are combined by time sharing and applied to one end of a delay line, and are separated at the output end of the line. The testing pulses derived from the two ends of the line are applied to a sensing device which senses whether the testing pulses are delayed by the proper amount, by a less time or by a greater time. The sensing device operates a control device which passes heating current through the delay line, adjusting the delay line temperature so as to secure and maintain the desired time delay.

In another embodiment of the invention the control device changes the timing of the testing pulses so as to preserve a desired ratio between their timing and the delay line time delay. The delay line temperature is uncontrolled and is permitted to be that of its surrounding environment.

In another embodiment of the invention two delay lines are closely associated in an enclosure so that they have the same temperature at all times. One line carries the data while the other line carries the testing pulses, thus obviating the need for time sharing and permitting a continuous flow of data.

In any of these three embodiments in order to transmit data of low frequency, or of zero frequency, it is only necessary to apply a carrier signal modulated by the data to the input and at the output to demodulate the carrier, all by means which are standard in the radio art, and which are outside of the scope of this invention.

The object of this invention is to provide control of a delay line directly from variations in the delay period itself.

A further understanding of this invention may be secured from the detailed descriptions and the drawings, in which:

FIGURE 1 is a schematic diagram of an embodiment of the invention.

FIGURE 2 presents graphs illustrating operation of the embodiment of FIGURE 1.

Figure 1:
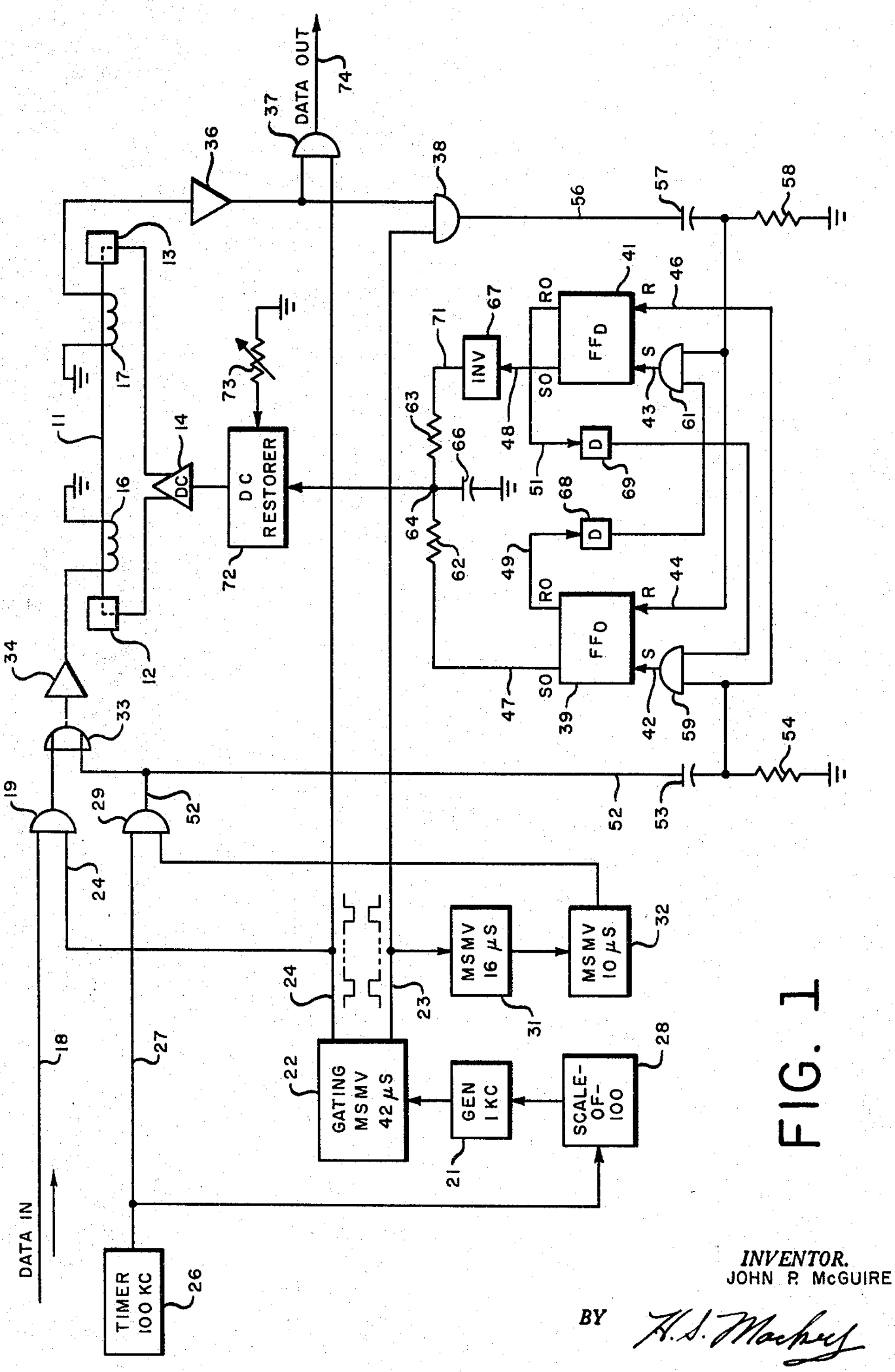

Referring now to FIGURE 1, a magnetostrictive delay line comprises a nickel wire 11 secured between vibrationabsorbing clamps 12 and 13. The ends of the nickel wire are connected to the output terminals of a direct-coupled amplifier 14, and the line is provided with an input coil 16 and an output coil 17. The length of the magnetostrictive delay line is such that the delay at a selected temperature, here for example at 40° C., is exactly one millisecond.

In the operation of this delay line, alternating current passed through the input coil 16 produces an axial alternating magnetic field. Because of the joule effect, a longitudinal change of length of the wire is generated which is propagated along the wire as a longitudinal vibration. This vibration generates a small potential at the receiving coil 17.

Positive input data are applied from conductor 18 to one input of an AND circuit 19. A 1-kc.p.s. generator 21 applies rectangular pulses to a gating monostable multivibrator 22. This multivibrator emits a 42 $\mu$s. positive rectangular pulse on its output conductor 23, starting each time that it receives a pulse from generator 21. The inverse signal, a positive pulse 958 $\mu$s. in length, is emitted on conductor 24. This conductor is connected to the AND circuit 19.

A 100-kc.p.s. timer 26 emits 2 $\mu$s. rectangular pulses. Its output conductor 27 is connected through a scale-of-100 circuit 28, by which the frequency is reduced to 1 kc.p.s., to slave the generator 21 so that the frequencies of generators 26 and 21 are in this ratio and so that the front of each 1-kc.p.s. pulse coincides with the front of a 100-kc.p.s. pulse. The output conductor 27 is also connected to one input of an AND circuit 29.

The gating multivibrator 22 controls a 16-$\mu$s. monostable multivibrator 31 so that the front of the 16-$\mu$s. pulse is coincident with the front of the 42-$\mu$s. pulse. The multivibrator 31 is connected to operate a 10-$\mu$s. monostable multivibrator 32, the front of the 10-$\mu$s. pulse coinciding with the trailing edge of the 16-$\mu$s. pulse. The output conductor of multivibrator 32 is connected to the other input of AND circuit 29.

The outputs of AND circuits 19 and 29 are connected to the two inputs of an OR circuit 33. Its output, after amplification in an amplifier 34, is connected to the input coil 16.

The output of the output coil 17 is amplified in amplifier 36 and applied to inputs of two AND circuits 37 and 38. These circuits also receive the normal and inverse outputs of the multivibrator 22 through conductors 23 and 24.

A circuit for sensing the existence of a delay error and its sign consists principally of two flip-flop circuits, 39 and 41. Each flip-flop circuit has a set input, 42 and 43, and a reset input, 44 and 46, all adapted to receive sharp positive pulses. Each circuit emits rectangular positive set output pulses at conductors 47 and 48, and positive reset output pulses from conductors 49 and 51. One input is obtained from the input end of the delay line through conductor 52 and a pulse-sharpening circuit consisting of capacitor 53 and resistor 54. A second input is obtained from the output of the delay line through the conductor 56 and the pulse-sharpening circuit consisting of capacitor 57 and resistor 58. These inputs are applied through AND circuits 59 and 61 to the set input terminals 42 and 43, and also directly to the reset input terminals 44 and 46. The set output terminal 47 is connected to one end of a pair of equal resistors 62 and 63 having their junction terminal 64 coupled to ground through a capacitor 66. The set output terminal 48 is connected to a polarity inverter 67 which applies equivalent negative pulses to the end of resistor 63. The reset output terminal 49 is connected through a delay circuit 68 to the second input of AND circuit 61, and the reset output terminal 51 is connected through a delay circuit 69 to the second input of AND circuit 59.

The set output conductors 47 and 48, each of which is either a positive potential or zero, are connected directly or through the inverter 67 to the ends of the equal resistors 62 and 63. Thus there may be applied to these resistors zero potentials at both ends or equal positive and negative potentials at the ends, in both cases causing zero potential at terminal 64. Or positive potentials is applied from conductor 47 with conductor 71 at zero, making terminal 64 positive, or negative potential is applied from conductor 71 with conductor 47 at zero, making terminal 64 negative.

Terminal 64 is connected to the input of a direct-current restorer circuit 72, where a positive bias adjustable by a variable resistor 73 is added. The output is amplified in direct-coupled amplifier 14 and applied to heat the nickel magnetostrictive wire 11.

In the operation of the error-sensing circuit comprising flip-flops 39 and 41, when pulses arrive simultaneously from conductors 52 and 56, they reset both flip-flops, causing zero potential at junction terminal 64. When, however, the pulse from conductor 52 is earlier than the pulse from conductor 56, the flip-flop 39 is set by the earlier pulse and reset by the later pulse, causing positive potential at the junction 64 for the time interval between pulses. When, on the other hand, the pulse from conductor 56 is earlier, it causes negative potential at the junction 64 for the time interval between pulses.

Figure 2:
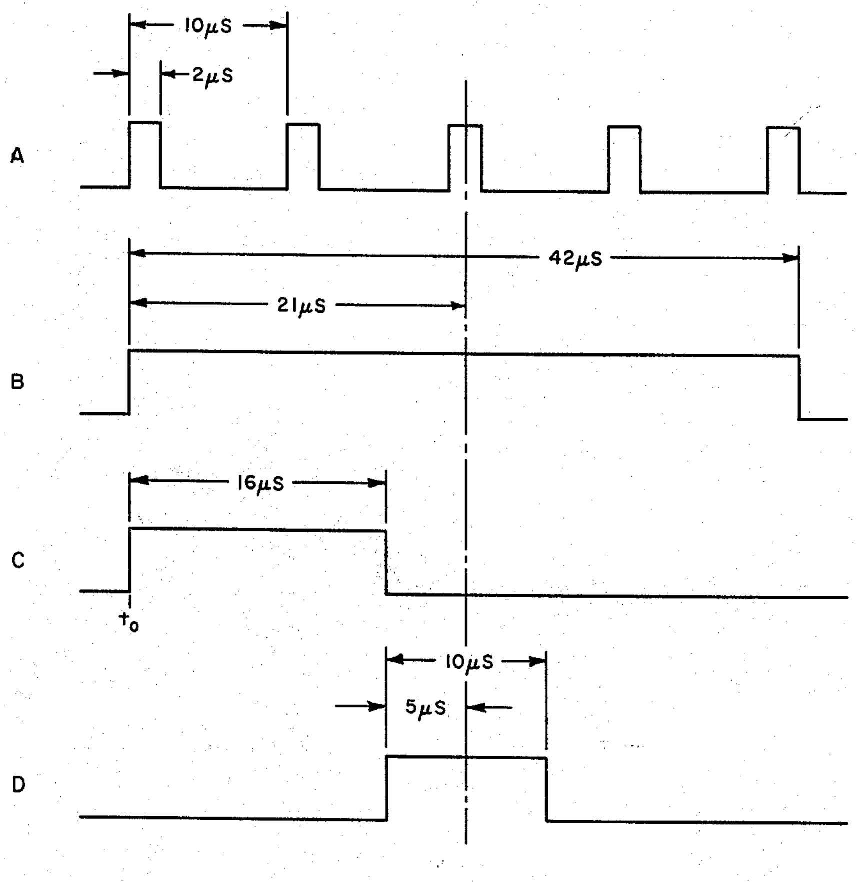

Operation of the entire delay line control circuit is as follows. Graph A, FIGURE 2, illustrates the output of the timer 26. The graph B depicts the 42-μs. square pulse output of the gating multivibrator 22, the forward edge of the pulse coinciding with the forward edge of a 2-μs. pulse from timer 26. Graph C depicts the output of multivibrator 31, the starting edge again coinciding at time $t_0$ with that of multivibrator 22 and of timer 26. Graph D depicts the output pulse of circuit 32 which follows the output pulse of circuit 31. It is obvious that the center of the 10-μs. output pulse of circuit 32 coincides with the center of a 2-μs. timing pulse, and also is centered in the 42-μs. pulse. This 10-μs. pulse is used in AND circuit 29 to gate the timer output, permitting only one pulse in each 100 to pass to conductor 52 and to the input of the delay line.

The AND circuit 19 is gated by the inverted pulse from conductor 24 having a length of 958 μs. to permit data from conductor 18 to flow for this length of time. Thus, the data and the timing pulse time share the transmission of the line 11, the data flowing for 958 μs. out of every 1000 μs. and the remaining 42 μs. being reserved for passage of the 2-μs. timing pulse. The data and timing pulses are combined in OR circuit 33 and both are applied to the delay line 11 in sequence. They are again separated at the receiving end. The AND circuit 37 is gated on for 958 μs. out of every 1000 μs. and data flows out conductor 74. For the remainder of the time, namely 42 μs. of each 1000 μs., AND circuit 38 is gated on, permitting the 2-μs. timing pulse to flow in conductor 56.

It will be observed that the delay time of line 11 is designed to be exactly equal to one period or cycle time of the generator 21, in this case one millisecond. It follows that the time of a 2-μs. pulse applied to the input end of the line at conductor 52 should exactly coincide in time with the arrival of the last preceding pulse at conductor 56. When this does occur, zero potential at the junction 64 is translated by the D.-C. restorer 72 to a level of heating current in the wire 11 which maintains the wire at such temperature as to maintain this desired delay.

If for any reason, including ambient temperature change, change of oscillator 26 frequency, or instability of any component, the coincidence of the pulses arriving on conductors 52 and 56 should disappear, a positive or negative potential would appear at junction 64 for a length of time proportional to the magnitude of error. This potential, through restorer 72 and amplifier 14, would either increase or decrease the heating current normally flowing in wire 11 to change the delay in such sense as to cause the two pulses again to be in coincidence.

Figure 3:
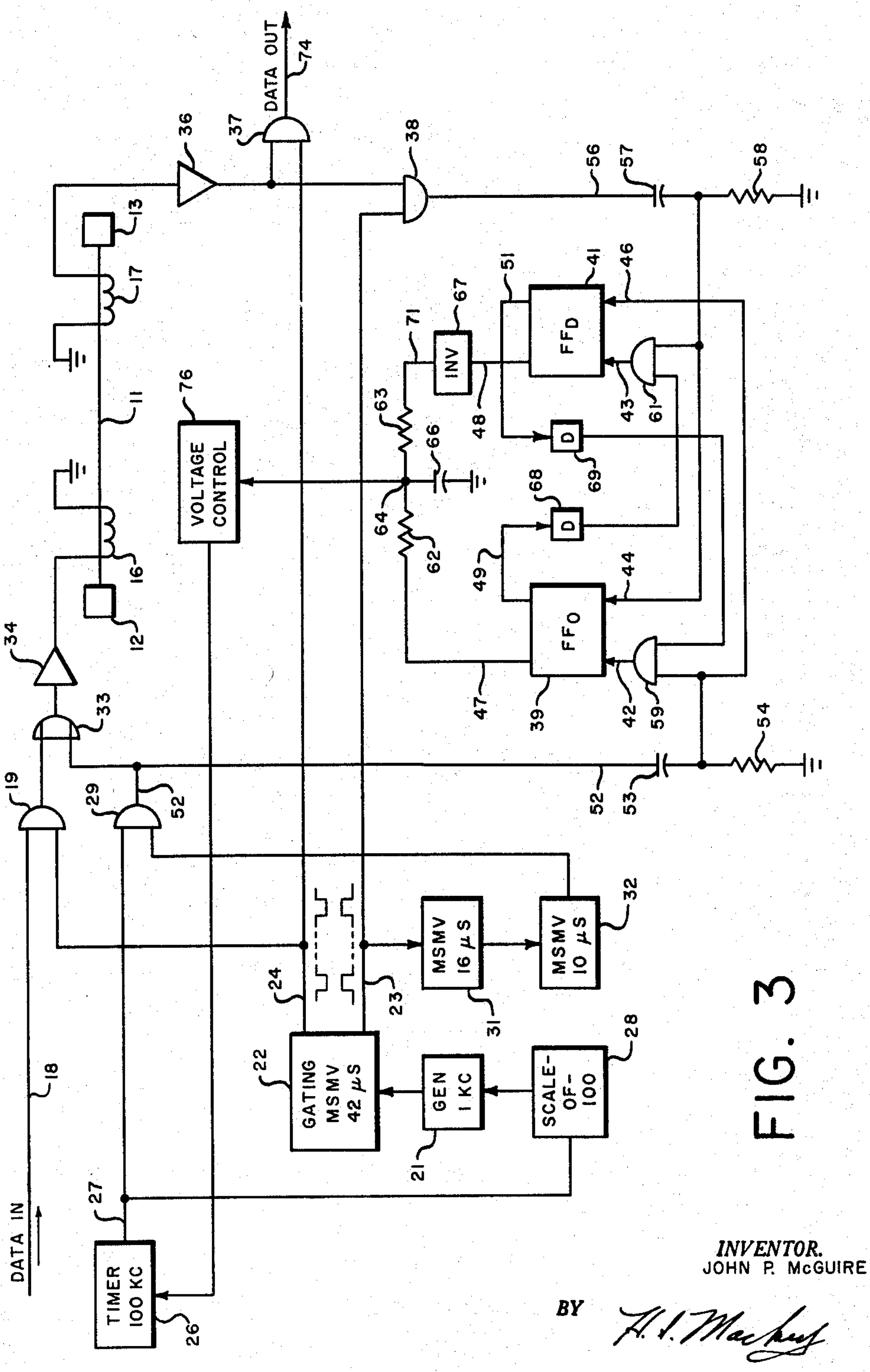
FIGURE 3 is an embodiment of the invention in which the timing oscillator frequency is controlled.

Another embodiment is depicted in FIGURE 3 differing only in the application of the error signal. In FIGURE 3 all components are similar to those in FIGURE 1, and similarly numbered, except that the junction 64 is connected to a voltage control circuit 76 the output of which controls the frequency of the 100-kc.p.s. timer 26. No heating current is passed through the nickel magnetostrictive delay line 11 and its temperature is allowed to be that of the ambient environment.

In operation, any misregistration of the pulses in conductors 52 and 56 causes such change in the frequency of oscillator 26 as again to cause the delay in line 11 to equal one period of the output of the 1-kc.p.s. generator 21.

In the foregoing examples the data and the timing pulses time share the single delay line. Instead, two closely associated delay lines can be used. These lines are heated by connecting them in series to the same source and are enclosed in a container so that thermal conditions are identical for both.

Figure 4:
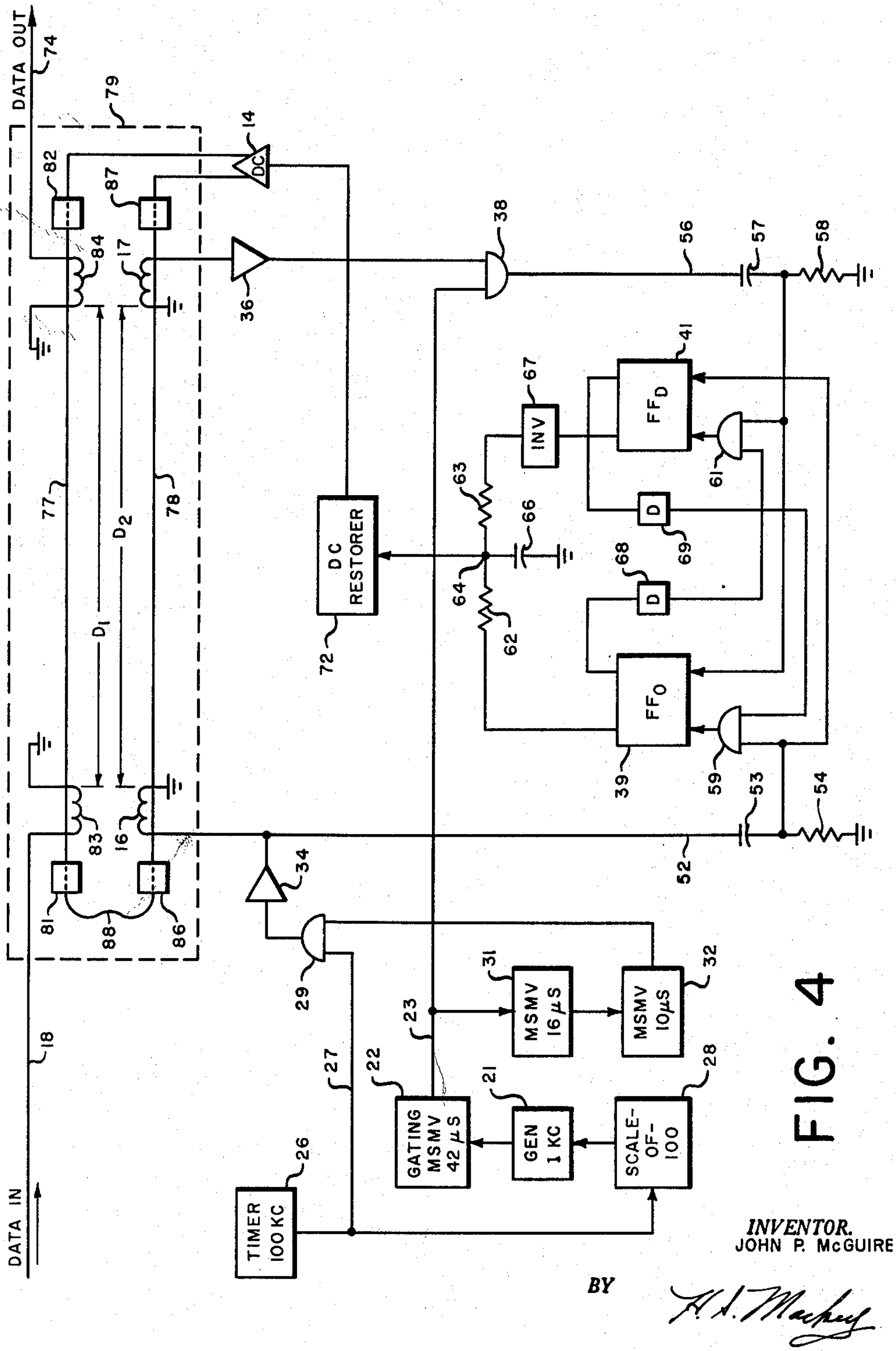
FIGURE 4 is an embodiment of the invention in which the data and timing pulses are separated so that data flow may be uninterrupted.

Such an embodiment is shown in FIGURE 4. Two identical nickel wires, 77 and 78, are positioned close together in an enclosing box 79. One wire, 77, is held between vibration-damping supports 81 and 82 and is provided with an input coil 83 and an output coil 84 separated by a distance $D_1$. The other wire, 78, is held between vibration-damping supports 86 and 87 and is provided with an input coil 16 and an output coil 17 separated by a distance $D_2$ which is equal to the distance $D_1$. One pair of ends of the wires is connected by a flexible conductor 88. The other ends are connected to the output of amplifier 14. The terminal 64 is connected to the input of restorer 72 and its output is connected to amplifier 14. All of the time-sharing components shown in FIGURES 1 and 3 are omitted.

In the operation of the circuit of FIGURE 4, the timing pulse is gated into the delay line 78 and retrieved from its output end. The data to be delayed must be continuously applied through conductor 18 to the input end of delay line 77 and secured through conductor 74 from the output end. The delays in the two lines 77 and 78 are reasonably assumed to be identical because of the identical lengths and line constructions, and because they have the identical thermal parameters and environments.

What is claimed is:

1. An automatic delay line control for a computer utilizing pulse data comprising,
 - a magnetostrictive delay line including an elongated magnetostrictive element, an input coil and an output coil,
 - means applying pulse data to be delayed to said input coil and receiving the delayed data from said output coil,
 - a timing pulse generator emitting pulses having a period which is nominally constant relative to the delay time of said line,
 - means comparing said pulse period with said delay time and emitting a signal which represents the sense and magnitude of the error in the nominally constant relation between said pulse period and said delay time,
 - and means operated by said signal to change the temperature of said delay line in such sense and amount as to eliminate said error.

2. An automatic delay line control for a computer utilizing pulse data comprising,
 - a magnetostrictive delay line including a wire of magnetostrictive metal, an input coil and an output coil,
 - a time-sharing circuit connected to said input coil, means applying pulse data to be delayed to said time-sharing circuit, a generator emitting timing pulses having a period which is nominally constant relative to the delay time of said line, said timing pulses being applied to said time-sharing circuit whereby pulse data and timing pulses pass over the delay line in time-sharing relation, means connected to said output coil for segregating said time-shared data and said timing pulses, means for comparing delayed and undelayed timing pulses impressed on said delay line and generating an error signal therefrom representing the disparity in the nominally constant relation between said pulse period and said delay time, and means operated by said error signal to change the temperature of said delay line so as to reduce the error signal to zero.

3. An automatic delay line control for a computer utilizing pulse data comprising, a magnetostrictive delay line including a wire of magnetostrictive metal, an input coil and an output coil, a time-sharing circuit connected to said input coil, means applying pulse data to be delayed to said time-sharing circuit, a generator emitting timing pulses having a period which is a nominal constant relative to the delay time of said line, means applying said timing pulses to said time-sharing circuit whereby pulse data and timing pulses pass over the delay line in time-sharing relation, means connected to said output coil for segregating said time shared data and said timing pulses, means for comparing delayed and undelayed timing pulses impressed on said delay line and generating an error signal therefrom representing the disparity in the nominally constant relation between delay time and pulse period, and means operated by said error signal to change the period of said generator pulses so as to eliminate said disparity.

4. An automatic delay line control for a computer utilizing pulse data comprising, a pair of identical magnetostrictive delay lines, each line having an input coil and an output coil separated by the same distance, said pair of lines being positioned in parallel side-by-side relation and enclosed in the same container, one pair of adjacent ends being electrically connected together, means applying pulse data to be delayed to the input coil of one line and securing delay pulse data from the output coil of the same line, a generator emitting timing pulses, the period thereof having a nominal constant relation to the delay time of each of said lines, means connecting said generator to apply the timing pulses to the other line of said pair of delay lines, a sensing circuit, means applying said timing signals to said sensing circuit both before and after passage over said other line, said sensing circuit including means for producing an error signal representing the disparity in said relation of delay time and period from the nominal value, a heating current generator connected to the other pair of ends of said delay lines, and means operated by said error signal for controlling the current of said heating current generator whereby the temperature of said pair of delay lines is changed so as to eliminate said disparity.

References Cited by the Examiner

UNITED STATES PATENTS

| | | | |
|---|---|---|---|
| 2,961,535 | 11/60 | Lanning | 328—55 |
| 3,024,444 | 3/62 | Barry et al. | 235—153 X |
| 3,031,118 | 4/62 | Frommer | 328—72 X |

ARTHUR GAUSS, *Primary Examiner.*